United States Patent Office 3,684,730
Patented Aug. 15, 1972

3,684,730
PREPARATION OF RARE EARTH OXIDE PHOSPHORS OF HIGH BRIGHTNESS AND CATHODOLUMINESCENT EFFICIENCY
Leon E. Sobon, Los Altos, Calif., assignor to the United States of America as represented by the United States Atomic Energy Commission
No Drawing. Filed Jan. 12, 1971, Ser. No. 105,974
Int. Cl. C09k 1/10
U.S. Cl. 252—301.4 R         9 Claims

ABSTRACT OF THE DISCLOSURE

Optimized procedure wherein an acidic chloride solution of a rare earth oxide host and a second rare earth activator in selected concentrations and at a particular pH is prepared, wherein the chloride solution is added to an oxalic acid solution to coprecipitate uniform proportions of the two rare earths as oxalates, wherein the solution is stirred at a particular temperature for a time period requisite to produce a desired particle form, wherein the precipitate is filtered hot, is dried and finally is calcined at an elevated temperature to produce the phosphor. The step of adding the chloride solution to the oxalic acid solution rather than the reverse is critical to produce a phosphor of highest brightness efficiency.

BACKGROUND OF THE INVENTION

This invention was made under or in the course of United States Atomic Energy Commission Contract No. AT(04-3)-674.

In recent years a new class of phosphors comprising certain trivalent rare earth activators substituted into hardy rare earth host compounds has appeared. In particular, europium activated yttrium oxide, yttrium vanadate and yttrium oxysulfide have had a major impact in the color television and lighting fields. Relatively little attention has been directed to the preparation of such materials for radiation sensing and measuring purposes. Conventional methods of preparing rare earth phosphors have been described, for example, by R. C. Ropp, J. Electrochem. Soc., volume III, No. 3, 1964, pp. 311–317. In procedures heretofore disclosed it is customary to form an oxalate coprecipitate by adding an oxalic acid solution to a solution or rare earth chlorides. When this procedure is followed, the concentrations of the rare earth constantly change during precipitation. In explanation thereof it has been demonstrated by Broadhead and Heady, Anal. Chem., volume 32, 1960, pp. 1603–1606, that the completeness or rare earth oxalate precipitation is affected by the concentration of rare earth in the solution. There is, for example, a threefold increase in rare earth oxalate loss for samarium and a tenfold increase in loss for yttrium in changing from a 0.02 molar to a 0.002 molar solution at pH 2.5. Similar losses should exist for europium. Such a differential loss during precipitation, as done conventionally therefore can result in a partial segregation of host and activator ions yielding a product of non-uniform composition and having less than optimum brightness and efficiency.

BRIEF SUMMARY OF THE INVENTION

The present invention relates generally to rare earth oxide phosphors and, more particularly, to a process in which a particular sequence of process operations and optimized or critical process parameters are employed to product activated trivalent rare earth phosphors of superior brightness and luminescent efficiency.

In accordance with the process of the invention there is first produced an acidic solution of a first rare earth element which is to serve as the host together with a second rare earth element serving as an activator. The solution is preferably an acidic chloride solution with an excess of acid and having a pH in the range of about 1.5 to about 3.5. The acidic chloride solution of the rare earth mixture is added to an oxalic acid solution containing an excess of oxalic acid to produce an oxalate coprecipitate. The particular technique of adding the chloride solution to an oxalic acid solution to produce the oxalate coprecipitate is quite important since the phosphors produced using this technique have been found to be at least 5 to 10% brighter than a corresponding phosphor using the conventional reverse technique of adding the oxalic acid to the acidic solution. The reason for the inferior results obtained in the later case may reside in the differential loss effect discussed above.

Precipitation is preferably carried out at an elevated temperature since larger size more easily filtered particles are produced. Moreover, stirring the precipitate in the solution at an elevated temperature above about 50° C. for at least two hours yields a relatively uniform particle size. After stirring, the coprecipitate is filtered hot, without washing, to relative dryness and is dried in a hot air oven to yield a light, easily crushed oxalate product which calcines to an easily crushed, free-flowing phosphor powder of high brightness. The dried oxalate is calcined in a closed container at an elevated temperature in the range of about 1100° to about 1450° C. and is then cooled and crushed to produce a free-flowing oxide powder which may be employed as a cathodoluminescent or other type of phosphor in accord with conventional procedures.

Accordingly, it is an object of the invention to provide a process for producing activated rare earth oxide phosphors having improved brightness and luminescent efficiency.

Another object of the invention is to provide a process including standardized and optimized operations and operating parameters for producing an activated rare earth oxide phosphor having high brightness and luminescent efficiency.

A further object of the invention is to provide a process for producing activated rare earth phosphors including the step of adding an acidic chloride solution mixture of a rare earth host element and a rare earth activator element to an aqueous solution of oxalic acid to produce an oxalate coprecipitate mixture of said elements having a uniform composition.

Other objects and advantageous features of the invention will be apparent from the following description of the process of the invention.

DESCRIPTION OF THE PROCESS

In operating the process of the invention, it is generally preferred to employ rare earth element oxides rather than rare earth salts because of the greater ease of handling and to avoid severe hydration problems. The oxides are also somewhat susceptible to pickup of water and gases from the atmosphere. Accordingly, as a precaution, the oxide starting materials are generally calcined at 1000° C., before weighing, to eliminate such contaminants. The procedures described hereinafter may be utilized with phosphor compositions ranging from below about 0.01 molar percent or less up to about 8% total molar percent of one or more rare earth element activators with the remainder comprising a trivalent rare earth element host oxide. Such range of activator content includes the ranges of phosphor compositions generally employed in cathodoluminescent, X-ray, gamma ray, ultraviolet light phosphors and the like.

Yttrium oxide ($Y_2O_3$) is widely used as a host rare earth oxide, for example, with europium as an activator to provide red color emitting phosphors in the color television industry. About 5% Eu is generally employed as the activator. $Gd_2O_3$ has generally been considered to be a more efficient host than yttrium but when prepared by the present method $Y_2O_3$-Eu and $Gd_2O_3$-Eu are of about equivalent efficiency and both are superior to those known heretofore in the art. It is considered that these materials are representative and that phosphors using other rare earth element activators and produced by the present procedure will likewise be superior. Other rare earth elements which may serve as activators include Pr, Nd, Sm, Gd(in$Y_2O_3$), Tb, Dy, Ho, Er, Tm and Yb.

It will be appreciated that the optimum concentrations of activator varies from element to element. Purity is important to the extent that materials having deleterious quenching or dilution effects may limit the brightness and efficiency of the phosphor although the process characteristically yields relatively brighter and more efficient phosphors than achievable by other methods. For example, dysprosium is a particularly troublesome impurity in europium activated $Y_2O_3$, i.e., when present in amounts greater than about $10^{-3}$ mole percent. $Y_2O_3$ of 99.9999% purity (less than 1 p.p.m. total impurity) was found to be satisfactory for all purposes. However, materials of lesser purity can be used where the troublesome impurity content is low, e.g., in Phoshor Grade reagents. Moreover, certain activators are resistant to quenching, e.g., Sm and Nd, and with these less pure $Y_2O_3$ may be used. Also, with certain hosts such as $Gd_2O_3$ the principal impurity may be one such, as for example, Eu, with which the phosphor is to be activated and may therefore be accommodated. In any event with equivalent amounts of impurities and activators the present procedure yields relatively brighter and more efficient phosphors.

The dry host and activator rare earth oxide components are weighed out and slurried in water, e.g., at least about 2:1, $H_2O$: oxide by weight, to minimize a violent exothermic reaction during dissolution in acid. It was found difficult to obtain reproducible results using batch sizes of less than about 15 grams of mixed oxides. Accordingly, a minimum batch size of 25 grams is preferably used to assure good results. Hydrochloric acid is then added drop by drop to the slurry with stirring and heating. An excess of acid, i.e., of the order of 10% excess, is used and the slurry is heated to about 80° C. to speed up solution. No difference in brightness of the phosphor is noted with an excess of acid up to about 25%. Under similar circumstances nitric acid solutions were found to yield phosphors of decreased brightness in every case.

The acidic chloride solution of the mixed rare earth oxides is adjusted to a pH in the range of about pH 1.5 to about 3.5 by adding dilute ammonium hydroxide solution thereto. While any pH in said range yields phosphors of equivalent brightness a pH of about 3 is generally preferred since a higher pH is more difficult to adjust reliably and a lower pH provides conditions more favorable to a differential loss of rare earth ions. The solution is then diluted to a standardized volume. For example, a standardized dilution may comprise about 1 part by weight in grams of the oxide in about 6 parts by volume in milliters of solution, e.g., 25 g. in 150 ml. of solution. This proportion can be varied somewhat without materially affecting brightness, e.g., 1:4 to about 1:8; however, consistent and directly comparable results from batch to batch requires a standardized dilution ratio.

Precipitation of the host and activator rare earth mixture as an oxalate coprecipitate from the acidic chloride solution is effected by adding such acidic chloride solution to a vigorously stirred oxalic acid solution of about 10% concentration by weight. Sufficient solution is employed to provide a stiochiometric excess of the order of 100% of oxalic acid. The chloride solution should be added gradually, e.g., over a 5 minute time period. The foregoing "chloride into oxalate" precipitation technique consistently produces a phosphor of at least 5% to 10% greater brightness than the corresponding conventional "oxalate into chloride" technique as noted above.

Precipitation temperatures in the range of about 20° to 80° C. yields phosphors of similar brightness. However, the lower temperatures tend to produce smaller, difficult to handle, particles and higher temperatures tend to decrease rare earth recovery. Therefore, precipitation temperatures near the center of said range, i.e., about 45° C. to 60° C. are preferable and 55° C. has been employed in a standardized procedure. With $Gd_2O_3$ phosphors an 80° C. precipitation temperature was found to be optimum.

Variation in stirring time affects the particle size and size distribution but not the brightness of the phosphor. In the absence of stirring a wide distribution of particle sizes is produced. Stirring of the precipitate in the solution at a temperature above about 50° C. for a period exceeding about 2 hours produces uniform size oxalate crystals. A stirring time of 2 hours at about 55° C. generally yields crystals with a size ranging from about 2 to 4 microns and represents an optimum condition for a standardized procedure.

$H_2O_2$ added as an oxidizer to the acidic chloride solution decreases the brightness in contrast to the experience of others using nitric acid solution in a conventional manner. The addition of $NH_4F$ to supply fluoride ion had no effect in either increasing or decreasing brightness.

Following completion of the stirring operation the precipitate is filtered hot, without washing, to apparent dryness (a crumbly filter cake) and the filter cake is then immediately placed in a hot air oven to dry overnight at a temperature from about 120° C. to about 150° C. This procedure yields a light, easily crushed oxalate which calcines to an easily crushed, free-flowing phosphor powder of high brightness. However, if the filter cake is placed in the oven while still wet the dried oxalate cake is hard and calcines to a hard, difficult-to-crush, phosphor oxide which is less bright. Washing of the precipitate does not affect brightness. It is considered that the coprecipitate can also be separated from the fluid phase, e.g., by centrifugation, etc. With yttrium oxide host phosphors, weight loss experiments on the thoroughly dried oxalates indicated that the formula was $Y_2(C_2O_4)_3 \cdot 3H_2O$. Recovery of the oxide product ranged from about 98.3% for a 40° C. precipitation to 97.4% for a 60° C. precipitation.

The thoroughly dried rare earth host-activator oxalate coprecipitate filter cake is calcined at an elevated temperature to provide the phosphor. The most important variable in calcination is the temperature since this condition affects the brightness. Calcination temperature may range from about 1100° C. to about 1450° C. The dried oxalate filter cake is disposed in a covered calcination container, e.g., a closed alumina boat or crucible. Heating at calcination temperature may be done in normal air atmosphere. Use of a closed vessel, i.e., a covered boat, is essential since calcination is an open vessel gives phosphors which are highly variable in brightness. The optimum calcine for $Y_2O_3$ (5% Eu) is heating to about 1350° C. for two hours in air. However, a temperature in the range of about 1300° C. to about 1450° C. assures relatively high brightness. With calcining temperatures below about 1300° C. calcining times longer than two hours are required for maximum brightness while at higher temperatures, i.e., of above 1300° C., no significant increase in brightness is gained by calcining for longer than about 2 hours. These results are also applicable to other rare earth-activator combinations as long as some deleterious crystal phase change or the like does not occur. For example, with $Gd_2O_3$ (5% Eu) heating to 1250° C. and above causes a phase change from cubic to monoclinic crystal with a concurrent sharp drop in brightness. Moreover, the spectra of phosphors calcined below and above 1250° C. are markedly different because of the different crystalline fields experienced by $Eu^{+3}$ ion in the cubic and monoclinic gadolinium oxide phases. A calcine of 2 hours at 1200° C. may be used as an optimum for $Gd_2O_3$ (Eu) phosphors. Following calcination the closed vessels containing the calcinate may be withdrawn and rapidly cooled to ambient temperature. The calcinate is then crushed to a free-flowing powder for use directly or with a suitable binder in accord with procedures well known in the art for use as a phosphor. The activated rare earth phosphors produced by the present method emit identical characteristic emission spectra whether excited with energetic electrons (cathodoluminescene) ultra-violet light or gamma and X-ray radiation. Accordingly the phosphors are generally useful in imaging, radiation detection, X-ray intensifier screen applications and the like. Aging for time periods in excess of 10 months had no effect on brightness.

Certain other results were noted which differ from those known in the art. Data obtained for $Y_2O_3$ (5% Eu) and $Gd_2O_3$ (5% Eu) are presented in Table I with data believed representative of those known in the art.

TABLE I.—CATHODOLUMINESCENT EFFICIENCY

| Phosphor | Radiant efficiency (percent) | |
|---|---|---|
| | This work | Prior art |
| $Y_2O_3$ (5% EU) | 10.2 | 7.5 |
| $Gd_2O_3$ (5% EU) | 10.2 | 9.0 |

The reference data is derived from the work of A. Bril and C. D. J. C. de Latt, Electro Chem. Technology, vol. 4, No. 1–2, 1966, pp. 21–24 and is believed to be typical to those obtained by already known prior art processes. In accord with said hitherto published data it has been widely assumed that the gadolinium-based phosphor is intrinsically more efficient than the yttrium-based phosphor. When produced by the present procedure both are of equivalent cathodoluminescent efficiency and both are of considerably higher efficiency than those known heretofore.

Data are set forth in Tables II following for optimum concentrations of Pr, Nd, Sm, Eu, Gd, Tb, Dy, Ho, Er, Tm and Yb activators in $Y_2O_3$ as prepared by the foregoing procedure. The data therein are for optimum concentrations of the activators, ranging from 0.03% for praseodymium to 4% by weight for europium. The maxima are somewhat broad so that proportions within about 20%± of those shown produce substantially similar results. However, it may be noted that the process of the invention produces brighter and more efficient phosphors even when the proportions are varied, i.e., a generally realizable improvement is obtained stemming from the more uniform composition obtained.

produce a normal eye response or with a photovoltaic cell. Power efficiencies were measured with a calibrated radiation thermocouple all in accord with usual laboratory practice.

Further details of the process of the invention will be set forth in the following illustrative examples:

EXAMPLE I

For preparing $Y_2O_3$ (5% Eu) the following illustrative procedure is employed:

(1) Weight out 23.105 g. $Y_2O_3$ and 1.895 g. $Eu_2O_3$.
(2) Slurry in 50 ml. $H_2O$.
(3) Dissolve by adding 57.5 ml. HCl in (10% stoichiometric excess) dropwise while stirring and with heating to about 80° C.
(4) Adjust to pH 3.0 by adding $NH_4OH$ solution.
(5) Add $H_2O$ to increase volume to 150 ml.
(6) Add the foregoing solution slowly to a stirred solution of 82 g. oxalic acid in 820 ml. $H_2O$ at about 55° C. to coprecipitate the rare earth as oxalates.
(7) Stir for 2 hours at about 55° C. to form uniform particle size particles.
(8) Filter while hot to apparent dryness.
(9) Dry filter cake overnight at about 130° C.
(10) Calcine the dry filter cake in closed alumina boats for 2 hours at 1350° C.
(11) Crush and sieve through 220 mesh screen.

EXAMPLE II $Gd_2O_3$ (5% Eu) phosphor was prepared as in Example I however using an 80° C. precipitation temperature and calcining for 2 hours at 1200° C. to avoid transition to the monoclinic crystal phase. Crystal size was 2 to 4 microns and cathodoluminescent efficiency as given in Table I. The other phosphors listed in Table II were prepared as in Example I.

While there have been described what may be considered to be preferred embodiments of the process, modifications therein may occur to those skilled in the art and it is intended to cover all such as fall within the scope of the appended claims.

What I claim is:

1. In a process for producing a rare earth activated rare earth oxide phosphor, the steps comprising:
    producing an acidic chloride solution containing a host rare earth element selected from the group consisting of yttrium and gadolinium in admixture with a different rare earth activator element selected from the group consisting of Pr, Nd, Sm, Eu, Gd, Tb, Dy, Ho, Er, Tm and Yb;

TABLE II.—SUMMARY OF RESULTS

| | Activation | | | | | | | | | | |
|---|---|---|---|---|---|---|---|---|---|---|---|
| | Pr | Nd | Sm | Eu | Gd | Tb | Dy | Ho | Er | Tm | Yb |
| Color | Pink | (IR) | Yellow | Red | (UV) | Green | White | Green | Green | Blue | (IR) |
| Optimum conc. (percent) | 0.03 | 0.5 | 0.2 | 4 | 3 | 0.3 | 0.2 | 1 | 1 | 0.8  2.5 | 2.5 |
| Principal emission (nm.) | 630/948 | 1,080 | 608 | 611 | 316 | 544 | 572 | 549 | 564/1,535 | 454/1,935 | 977 |
| Efficiency (percent) | 3.0 | 5.9 | 3.3 | 10.3 | 4.5 | 3.5 | 5.8 | 1.4 | 1.8 | 3.6 | 4.3 |
| Relative brightness | 1.4 | | 4.9 | 22 | | 13 | 17 | 2.4 | 3.7 | 0.75 | |
| Rise/decay times, total emission (msec.) | 0.08/0.13 | a0.20/0.40 | 0.5/1.25 | 0.50/1.1 | 0.60/2.0 | 0.7/1.4 | 0.25/0.4 | 0.04/0.07 | 0.04/0.07 | 0.004/0.006 | a0.40/0.65 |
| Rise/decay times, principal emission (msec.) | b0.12/0.16 | c/0.26 | 0.6/1.2 | 0.60/1.0 | 0.70/2.0 | 0.9/1.7 | 0.15/0.4 | 0.06/0.08 | b0.05/0.07 | b0.004/0.017 | |
| Energy gap (cm.$^{-1}$)d | 7,000 | 5,200 | 7,500 | 12,300 | 32,000 | 14,500 | 7,900 | 2,900 | 3,000 | 6,000 | 10,300 | a Total emission was measured with a 7102 phototube. An R136 phototube was used in all other measurements.
b These values refer to the principal emission in the visible spectrum.
c Ref. 12.
d Ref. 11.

Cathodoluminescent spectra were measured using either a spectrophotometer or a monochromator with an adjustable voltage electron beam excitation unit designed so that the sample would be at the focus of the spectrophotometer. In the monochromator a toroidal mirror was used to gather the luminescent output and focus it on the entrance slit. Luminous efficiencies were measured using either a multiplier phototube with filter appropriate to adjusting the acidity of said acidic chloride solution to a pH value in the range of about 1.5 to about 3.5;
adding said acidic chloride solution of host rare earth and activator rare earth to an oxalic acid solution containing an excess of oxalic acid with mixing to coprecipitate an intermixed rare earth host and activator element oxalate therefrom;

separating the intermixed rare earth element oxalate coprecipitate from the solution;

drying the rare earth element oxalate coprecipitate; and then calcining said coprecipitate in a closed vessel at an elevated temperature in the range of about 1100° C. to about 1450° C. said temperature being below that at which a deleterious crystal change can occur, to produce said phosphor.

2. A process as defined in claim 1 wherein the oxides of said rare earth elements are employed to produce said acidic chloride solution and wherein the proportion of rare oxide in grams to the volume of solution in milliliters is in the range of about 1:4 to about 1:8.

3. A process as defined in claim 2 wherein said acidic chloride solution is produced by slurrying a host rare earth element oxide and at least one activator rare earth element oxide in water and adding H Cl solution to said slurry while heating.

4. A process as defined in claim 3 wherein said oxalic acid solution contains about a 100% excess of oxalic acid over that required to form said coprecipitate, wherein said solutions are heated to a temperature in the range of about 20° C. to about 80° C.

5. A process as defined in claim 4 wherein said solution from which the rare earth element oxalates are coprecipitated is stirred at a temperature of at least about 50° C. for a time of at least about 2 hours to produce a uniform particle size coprecipitate.

6. A process as defined in claim 5 wherein said host rare earth element is yttrium and said different rare earth activator element is europium in an amount of about 0.01 molar percent to about 8 molar percent of the yttrium, wherein said acidic chloride solution is adjusted to about pH 3, wherein said acidic chloride solution is then intermixed with the oxalic acid solution at about 55° C. to form said coprecipitate and wherein the dried coprecipitate is calcined for about 2 hours at 1350° C.

7. A process as defined in claim 5 wherein said host rare earth element is gadolinium and said different rare earth activator element is europium in an amount of about 0.01 molar percent to about 8 molar percent, wherein said acidic chloride solution is adjusted to about pH 3, wherein said acidic chloride solution is then intermixed with the oxalic acid solution at about 80° C. to form said coprecipitate, and wherein said dry coprecipitate is calcined for about 2 hours at a temperature of at most 1200° C.

8. A process as defined in claim 6 wherein the europium content is about 5 molar percent of said yttrium.

9. A process as defined in claim 6 wherein said europium content is about 5 molar percent of said gadolinium.

References Cited

UNITED STATES PATENTS 3,322,682  5/1967  Thompson _____ 252—301.4 R
3,484,381  12/1969  Yale et al. _____ 252—301.4 R ROBERT D. EDMONDS, Primary Examiner